US009132573B2

(12) United States Patent
Vogt et al.

(10) Patent No.: US 9,132,573 B2
(45) Date of Patent: Sep. 15, 2015

(54) STORAGE AND MIXING DEVICE FOR BONE CEMENT

(71) Applicant: Heraeus Medical GmbH, Wehrheim (DE)

(72) Inventors: Sebastian Vogt, Erfurt (DE); Tim Schnieber, Frankfurt (DE)

(73) Assignee: Heraeus Medical GmbH, Wehrheim (DE)

( * ) Notice: Subject to any disclaimer, the term of this patent is extended or adjusted under 35 U.S.C. 154(b) by 391 days.

(21) Appl. No.: 13/679,562

(22) Filed: Nov. 16, 2012

(65) Prior Publication Data

US 2013/0135959 A1    May 30, 2013

(30) Foreign Application Priority Data

Nov. 25, 2011   (DE) .......................... 10 2011 119 377

(51) Int. Cl.
*B01F 15/00*     (2006.01)
*B29B 7/28*      (2006.01)
(Continued)

(52) U.S. Cl.
CPC ............... *B29B 7/28* (2013.01); *B01F 11/0054* (2013.01); *B01F 13/003* (2013.01); *B01F 15/00525* (2013.01); *B01F 15/0206* (2013.01);
(Continued)

(58) Field of Classification Search
CPC ............. B01F 15/0205; B01F 15/0206; B01F 15/0212; B01F 15/0215; B01F 15/0258; B29B 7/28
USPC ............................................. 366/139, 163.1
See application file for complete search history.

(56) References Cited

U.S. PATENT DOCUMENTS 1,299,668 A   4/1919  Blomquist
2,308,837 A   1/1943  Smith
(Continued)

FOREIGN PATENT DOCUMENTS

CA        2708729 A1    1/2011
DE      3 640 279 A1    6/1987
(Continued)

OTHER PUBLICATIONS

English-Language Translation of Japanese Office Action for corresponding Japanese Patent Application No. 2012-256016 dated Dec. 3, 2013.
(Continued)

*Primary Examiner* — Charles Cooley
*Assistant Examiner* — Marc C Howell
(74) *Attorney, Agent, or Firm* — Norris McLaughlin & Marcus, P.A.

(57) ABSTRACT

A device stores and mixes a liquid and a solid component, in particular, the device mixes and stores a monomer liquid and a powder for producing bone cement. The device contains two chambers of which the first chamber contains the solid component and is separated from a second chamber that contains the liquid component by means of a separation that can be opened. A mixing facility that can be driven by means of a pressure difference is arranged in the first chamber. In the present storage and mixing system, a vacuum that is available in the operating theatre is used to mix a monomer liquid and a bone cement powder in a vacuum and to operate a mixing facility simultaneously. Moreover, the vacuum can also be used to open a separation between monomer liquid and mixing space and to transfer the monomer liquid into the mixing space.

16 Claims, 2 Drawing Sheets

Figure 1:
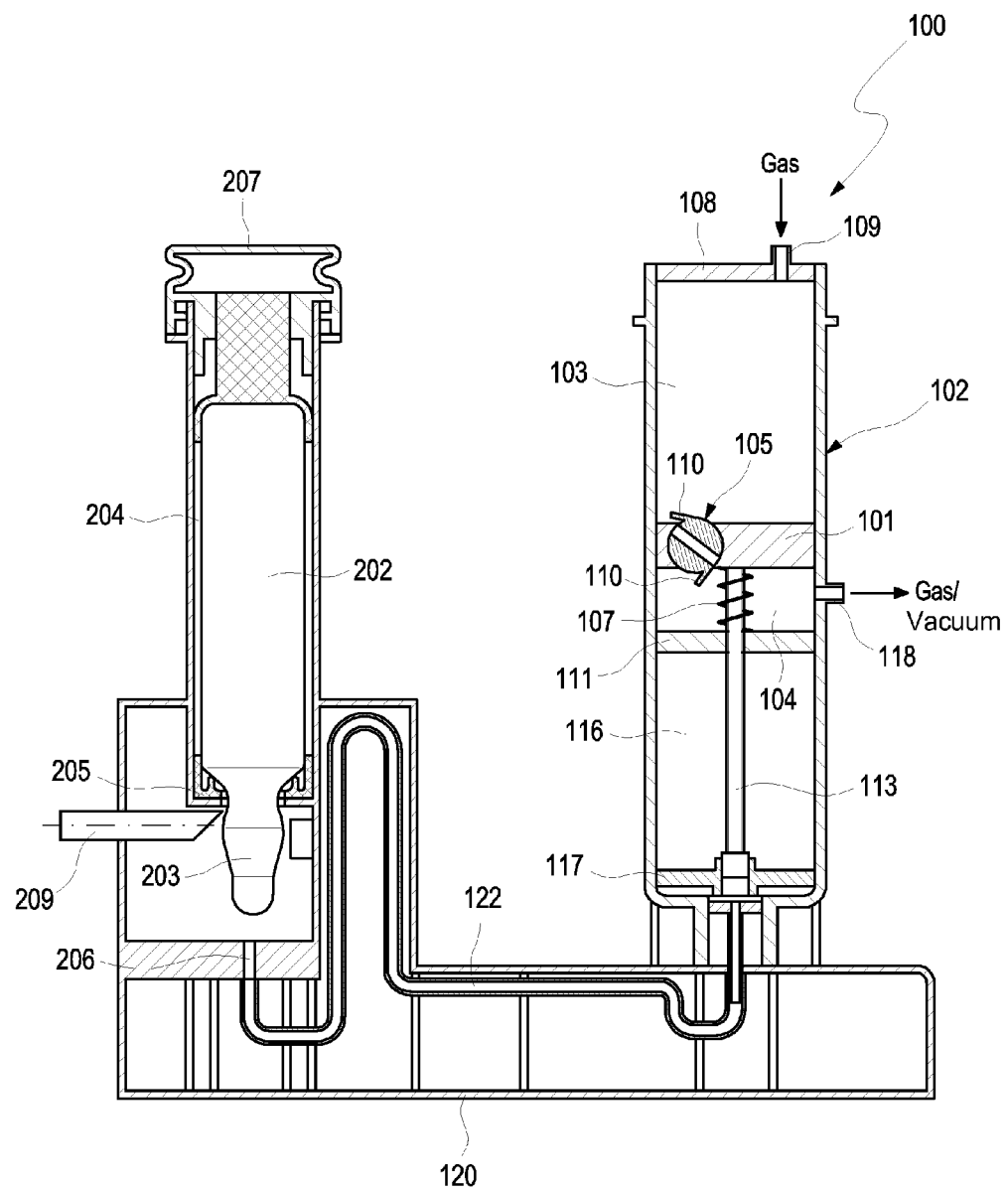

(51) Int. Cl.
*B01F 11/00* (2006.01)
*B01F 13/00* (2006.01)
*B01F 15/02* (2006.01)

(52) U.S. Cl.
CPC ......... *B01F15/0226* (2013.01); *B01F 15/0258* (2013.01); *B01F 2215/0029* (2013.01)

(56) References Cited

U.S. PATENT DOCUMENTS

| | | | |
|---|---|---|---|
| 2,462,580 | A | 2/1949 | Watson |
| 3,173,341 | A | 3/1965 | Carpenter |
| 3,254,640 | A | 6/1966 | Sprouse |
| 3,417,971 | A | 12/1968 | Blank et al. |
| 3,476,016 | A | 11/1969 | Dixon |
| 3,496,986 | A | 2/1970 | Nyc |
| 3,738,535 | A | 6/1973 | Nicholls |
| 3,986,439 | A | 10/1976 | Ring |
| 4,671,263 | A | 6/1987 | Draenert |
| 4,758,096 | A | 7/1988 | Gunnarsson |
| 4,825,752 | A | 5/1989 | Kiffmeyer |
| 4,949,622 | A | 8/1990 | Brooks |
| 4,973,168 | A | 11/1990 | Chan |
| 5,031,664 | A | 7/1991 | Alaze |
| 5,100,241 | A | 3/1992 | Chan |
| 5,344,232 | A | 9/1994 | Nelson et al. |
| 5,551,778 | A | 9/1996 | Hauke et al. |
| 5,586,821 | A | 12/1996 | Bonitati et al. |
| 5,588,745 | A * | 12/1996 | Tanaka et al. ........ 366/130 |
| 5,624,184 | A | 4/1997 | Chan |
| 5,624,186 | A | 4/1997 | Ogier |
| 5,677,483 | A | 10/1997 | Tam |
| 5,842,785 | A | 12/1998 | Brown et al. |
| 5,997,544 | A | 12/1999 | Nies et al. |
| 6,033,105 | A | 3/2000 | Barker et al. |
| 6,592,247 | B1 | 7/2003 | Brown et al. |
| 6,709,149 | B1 | 3/2004 | Tepic |
| 7,650,829 | B2 | 1/2010 | Beck |
| 2003/0155381 | A1 | 8/2003 | Chan |
| 2007/0211565 | A1 | 9/2007 | Plishka et al. |
| 2008/0093574 | A1 | 4/2008 | Ohta |
| 2010/0329074 | A1 | 12/2010 | Vogt et al. |
| 2011/0079142 | A1 | 4/2011 | Albrecht et al. |
| 2011/0272433 | A1 | 11/2011 | Vogt et al. |

FOREIGN PATENT DOCUMENTS

| | | |
|---|---|---|
| DE | 10 2009 031 178 | 9/2010 |
| EP | 0 692 229 A1 | 1/1996 |
| EP | 1 005 901 A2 | 6/2000 |
| EP | 1 016 452 A2 | 7/2000 |
| EP | 1 020 167 A2 | 7/2000 |
| EP | 1 920 738 A2 | 5/2008 |
| GB | 912237 | 12/1962 |
| GB | 1300093 | 12/1972 |
| JP | S53-23782 | 3/1978 |
| JP | 2002052331 A | 2/2002 |
| JP | 2011005255 A | 1/2011 |
| JP | 2011025043 A | 2/2011 |
| SU | 960022 A2 | 9/1982 |
| WO | 94 26403 A1 | 11/1994 |
| WO | 99 42205 A1 | 8/1999 |
| WO | 99 67015 A1 | 12/1999 |

OTHER PUBLICATIONS

Australian Examination Report for corresponding Australian Patent Application No. 2012254869 dated Oct. 14, 2013.

Breusch et al., "Der Stand der Zementiertechnik in Deutschland," Z. Orthop, 137; pp. 101-107 1999, English language abstract in right column on pp. 101.

Charnley, "Anchorage of the femoral head prosthesis of the shaft of the femur," J. Bone Joint Surg. 42; pp. 28-30; 1960.

Final Rejection from related U.S. Appl. No. 13/679,428, mailed Apr. 22, 2015.

\* cited by examiner

STORAGE AND MIXING DEVICE FOR BONE CEMENT

The invention relates to a storage and mixing device for storage and mixing of a liquid and a solid component according to the features of the generic part of claim 1 having a first chamber that contains the solid component and comprises a connection for a source of negative pressure and which is separated from a second chamber by means of a separation that can be opened, whereby the second chamber contains the liquid component. This concerns, in particular, a device for mixing and storing a monomer liquid and a powder for producing bone cement.

PMMA bone cements are based on the pioneering work of Sir Charnley (Charnley, J.: Anchorage of the femoral head prosthesis of the shaft of the femur. J. Bone Joint Surg. 42 (1960) 28-30). They consist of a liquid monomer component and a powder component. The monomer component generally contains the monomer, methylmethacrylate, and an activator (N,N-dimethyl-p-toluidine) dissolved therein. The powder component, also called bone cement powder, contains one or more polymers that are produced through polymerisation based on methylmethacrylate and co-monomers, such as styrene, methylacrylate or similar monomers, a radiopaquer, and the initiator, dibenzoylperoxide.

It is customary to store the monomer liquid in glass ampoules or in pouches made of composite plastic film or composite aluminium foil. Said primary monomer containers need to be opened right before mixing the cement by breaking them open manually or by piercing or cutting them open. It is customary to store the cement powder in paper-plastic bags. These also need to be opened before mixing by cutting or tearing them open.

Mixing the powder component and the monomer component, swelling of the polymers of the powder component in the methylmethacrylate generates a dough that can be shaped plastically and is the actual bone cement. Mixing the powder component and the monomer component, the activator, N,N-dimethyl-p-toluidine, reacts with dibenzoylperoxide while forming radicals. The radicals thus formed trigger the radical polymerisation of the methylmethacrylate. Upon advancing polymerisation of the methylmethacrylate, the viscosity of the cement dough increases until the cement dough solidifies.

Polymethylmethacrylate bone cements can be mixed by mixing the cement powder and the monomer liquid in suitable mixing beakers with the aid of spatulas. This procedure is disadvantageous in that air inclusions may be present in the cement dough thus formed and cause destabilisation of the bone cement later on. For this reason, it is preferred to mix bone cement powder and monomer liquid in vacuum mixing systems, since mixing in a vacuum removes air inclusions from the cement dough to a large extent (Breusch S. J. et al.: Der Stand der Zementiertechnik in Deutschland. Z. Orthop. 1999, 137: 101-07). Bone cements mixed in a vacuum have clearly reduced porosity and thus show improved mechanical properties. A large number of vacuum cementing systems have been disclosed of which the following shall be listed for exemplary purposes:

U.S. Pat. No. 6,033,105 A, U.S. Pat. No. 5,624,184 A, U.S. Pat. No. 4,671,263 A, U.S. Pat. No. 4,973,168 A, U.S. Pat. No. 5,100,241 A, WO 99/67015 A1, EP 1 020 167 A2, U.S. Pat. No. 5,586,821 A, EP 1 016 452 A2, DE 3 640 279 A1, WO 94/26403 A1, EP 0 692 229 A1, EP 1 00 590 1 A2, U.S. Pat. No. 5,344,232 A, and EP 1 920 738 A2.

Vacuum cementing systems are a refinement, in which both the cement powder and the monomer liquid are already pre-packaged in separate compartments of the mixing systems and are mixed with each other only right before application of the cement in the cementing system, as described, for example, in U.S. Pat. No. 5,997,544 A, EP 0 692 229, U.S. Pat. No. 6,709,149. However, one essential problem of these systems is the sterilisation of the entire system including the cement powder and the previously sterile filtered monomer liquid.

DE 10 2009 031178 A1 therefore proposed a device for mixing and dispensing bone cement, whereby an axially mobile two-part plunger system is arranged in the region of the first cylinder end and comprises a sterilisation plunger and a sealing plunger. The sterilisation plunger and the sealing plunger are situated to be axially mobile on the actuation rod separate of each other, whereby the sterilisation plunger closes the mixing cylinder in a gas-permeable manner and the sealing plunger closes the mixing cylinder in a gas-tight manner.

It is a disadvantage of this system that the mixing of the liquid cement component and the powder-shaped component is effected through manual actuation of a mixing rod having a mixing organ. Aside from the force it requires, manually-driven mixing is disadvantageous since the mixing result depends strongly on how the individual person performs the mixing process. The force used by the person, the number of vertical mixing motions, the angle of rotation of the mixing motions, the maximal deflection of the mixing organ in the direction of the plunger head and plunger floor, and the overall mixing time affect the mixing result with regard to the homogeneity of the cement dough. The cement quality can therefore vary strongly between different medical users.

It is the object of the present invention to generate a device for mixing bone cement, in which the mixing process requires less force and also proceeds independent of the individual medical user to yield a reproducible result.

To meet said object, a device for storage and mixing of bone cement having the features of claim 1 is proposed. The dependent claims each define preferred refinements.

The storage and mixing device according to the invention serves for mixing a liquid component and a solid component. It contains a first chamber containing the solid component, a second chamber containing the liquid component, and a separation that can be opened and is situated between the liquid component and the first chamber. The first chamber comprises a connection for a source of negative pressure and has a mixing facility arranged in it that can be driven through a pressure difference.

Preferably, the first chamber is elongate in shape and has the same cross-section along a long part of its length. Particularly preferably, this is a cylinder, although a rectangular prism or other prisms are conceivable just as well.

The liquid component to be mixed is present in the second chamber. The second chamber can take any shape and initially serves also as a storage vessel for the liquid component. In this context, the second chamber can be integrated directly into the storage and mixing device as a component or it can be a sterilised packaging unit or a storage container for the liquid component that is arranged in the storage and mixing device. Time-proven as sterile storage containers are, in particular, ampoules made of glass which are advantageous, in particular when the device serves for mixing bone cement, in that they sterilise well and do not get contaminated during storage either. However, other storage vessels are conceivable as well.

The liquid component is separated from the first chamber in liquid-tight manner during storage by means of a separation, but the separation can be opened such that it is feasible to transfer the liquid to the first chamber containing the solid component.

An advantageous refinement of the device according to the invention is characterised in that the first chamber is subdivided into a plunger space and a mixing space. The plunger space has a plunger of a mixing facility arranged in it. The plunger is connected to a mixing organ that mixes the two components with each other in the mixing space. The plunger space comprises a connection for a source of negative pressure. This connection can be used to connect the device to a vacuum pump. The vacuum pump then generates the negative pressure that is to be built-up in the first chamber in order to operate the mixing facility. As shall be illustrated in detail later, the negative pressure firstly makes the liquid component, in particular the monomer liquid, flow into the bone cement powder. In a preferred embodiment of the invention, the negative pressure also provides for the separation to the second chamber or storage container containing the liquid component to be opened. Arranging a vacuum connection in the plunger system has proven to be particularly advantageous due to the easy availability.

Preferably, a plunger is moved in a plunger space by means of a negative pressure or vacuum. Preferably, the plunger space is a hollow cylinder which is covered on one end by means of a plunger closure and separated from the mixing space on the other end by means of a dividing wall. The end of the mixing space opposite from the dividing wall has a connecting line to the second chamber for the liquid component attached to it.

The plunger is mobile along the cylinder axis and touches against the side walls of the plunger space in a gas-tight manner. In a particularly preferred embodiment, the plunger is connected to an axially mobile rod by means of a rotary joint in a positive fit- or non-positive fit-like manner such that the rod can perform a motion about an axis independent of a rotation of the plunger. The plunger subdivides the plunger space into a first and a second plunger space section and contains a blocking organ, which, in the open state, connects plunger space sections to each other. In the closed state, the blocking organ closes said passage in gas-tight manner. The blocking organ is switched from the closed to the open state at a turnaround point of the plunger, and is switched from the open to the closed state at the other turnaround point. A vacuum or compressed gas is used to make the plunger move such that it moves back and forth in the plunger space and thus makes the rod perform a rotary motion. A mixing organ provided at the rod mixes the bone cement.

The blocking organ arranged in the plunger comprises at least one passage, which, in the open position, connects the first plunger space section on one side of the plunger and the second plunger space section on the other side of the plunger in a gas-permeable manner and, in the closed position, separates the two plunger space sections from each other in a gas-tight manner.

Preferably, the cross-section of the passage in the blocking organ is larger than the cross-section of the gas outlet. It is also preferred that the cross-section of the passage in the blocking organ is larger than the cross-section of the gas feed. This ensures that complete pressure equalisation with the surrounding atmosphere occurs until the blocking organ is switched at the plunger turnaround points.

Preferably, the blocking organ is a rotary valve. Particularly preferably, the rotary valve is controlled through two pins that are attached at the external circumference of the rotary valve and are arranged at an angle of <180° with respect to each other originating from the rotation axis of the rotary valve. The rotary valve is switched from the open to the closed position and vice versa by the pin being made to hit against a wall of the plunger space as a result of the plunger motion. In the process, the pin is pressed against the plunger, the rotary valve rotates about its axis and switches from the open state to the closed state or vice versa.

Other options are conceivable as well. Accordingly, a shiftable closure, such as, for example, a hollow cylinder that is closed on one side and has lateral openings, can be shifted to an open and closed position when it hits the walls of the plunger space.

The plunger subdivides the plunger space into two plunger space sections. The plunger space between dividing wall and plunger is provided with a connection for a source of negative pressure or a vacuum connection, whereas the other plunger space comprises a gas feed.

A rotary joint connects the plunger to a rod, which has a mixing organ attached to it. The rod extends through the dividing wall between plunger space and mixing space.

An elastically restoring structural element is arranged between plunger and dividing wall between plunger space and mixing space. Preferably, the elastically restoring structural element is a spring element, particularly preferably a coil spring.

In the closed state of the blocking organ, the plunger moves as a result of the forces exerted on the plunger through the pressure difference and pressure equalisation. This means that the plunger moves towards the dividing wall when negative pressure is applied and the blocking organ is closed. When the plunger hits against the dividing wall, the blocking organ is switched to the open state and the pressure can be equalised. The restoring force of the elastically restoring structural element moves the plunger in the direction of the plunger space cover. In the process, the plunger section having the gas feed decreases in size and the plunger hits against the opposite wall and the blocking organ is closed again. This process is repeated for as long as gas is being discharged or supplied.

This process is effected through alternating build-up of a pressure difference and pressure equalisation in both plunger space sections. The pressure difference is of crucial importance in this context, but it is insignificant if an over-pressure is applied on the side of the gas feed or a negative pressure is applied on the side of the connection for the negative pressure. It is preferred to apply a negative pressure on the side of the connection for the negative pressure, since a vacuum, which also serves to degas the bone cement, is already present there.

The plunger is connected to a mixing organ through a connecting element, such as, for example, a rod. Preferably, the rod can be rotated, for example through a rotary joint, such as a torsion joint or ball joint.

The rod extends through the dividing wall that has an opening with a diameter that corresponds to the external diameter of the rod. The rod is arranged in this opening such as to be axially mobile.

Preferably, the rod has at least one steep thread that is engaged by a peg that is arranged in the opening of the dividing wall such as to be immobile. The connected rod moves along during the axial plunger motion. Concurrently, the rod rotates about its axis by means of the immobile peg engaging the thread. As a result, the mixing organ that is arranged at the end of the rod also performs a linear axial motion and a rotary motion simultaneously. The bone cement is mixed through these combined motions.

The rod should be sufficiently long for the mixing organ to touch the floor of the mixing space such that the bone cement at the floor of the mixing space is also being mixed. Preferably, the rod can be moved in the plunger in the direction of the closed end to a sufficient extent for the upper side of the mixing organ to touch against the underside of the plunger closure. As a result, even cement residues at the underside of the plunger closure can be wiped off safely by the mixing organ. It is advantageous for the mixing organ to touch against the internal side of the cartridge by means of its external edge.

According to the invention, the mixing is effected, without any manual force acting, through a vacuum-driven or pressure-driven drive unit. Cementing systems that are currently common in the market contain vacuum pumps that generate a vacuum of up to 100-150 mbar. The device according to the invention can utilise said vacuum of approximately 150 mbar for propelling.

The device is used for mixing polymethylmethacrylate bone cements and inorganic bone cements containing calcium phosphate and/or calcium sulfate as their main components. This relates mainly to calcium phosphate cements based on amorphous calcium phosphate, α-tricalcium phosphate, β-tricalcium phosphate, tetracalcium phosphate, brushite, monetite, and octacalcium phosphate as well as mixtures thereof. Calcium sulfate bone cements are based on calcium sulfate hemihydrate.

An advantageous refinement of the bone cement system according to the invention is characterised in that a basic element is present that comprises a connecting element for a non-positive fit- and/or positive fit-like connection to the device, in particular a dispensing opening of the device. The purpose of the basic element is to accommodate the first and the second chamber and the connecting line. Since the first chamber for accommodation of the solid component, which also contains the mixing space, can also be used to dispense the bone cement, it is advantageous for the part of the device containing the first chamber to be reversibly separable from the basic element. This can be attained by means of a coupling element. Advantageously, the coupling element is a thread onto which the dispensing opening the part of the device containing the first chamber can be screwed. This means ensures that the connection is secure.

According to the invention, the storage and mixing device contains a second chamber for the liquid component, in particular the monomer liquid. In order to produce the bone cement, monomer liquid needs to be introduced into the bone cement powder. The bone cement then hardens after a certain period of time. Therefore, the bone cement cannot be delivered inside the device in a condition ready for dispensation. It is therefore necessary to store the bone cement powder and the monomer liquid separately until shortly before dispensation of the bone cement. Preferably, the second chamber contains a sterilised storage unit containing the monomer liquid. Glass containers, such as, e.g., ampoules, have proven to be easy to disinfect. In order to control the inflow of monomer liquid, a valve means can be arranged between first and second chamber. Said valve means controls and/or triggers the inflow of monomer from the second chamber into the mixing space.

A particularly preferred refinement of the invention provides the storage and mixing device to comprise an opening element that releases, directly or indirectly, the path of the liquid component by means of the pressure difference built-up through the applied negative pressure.

Direct opening of a container through the pressure difference shall be understood to mean that the external pressure moves a mobile means, for example a pestle, relative to the container and thus opens the container by mechanical means, i.e., for example, through breaking, cutting or piercing a part of the container, for example a container wall, to render it open. For this purpose, the opening means is supported in the storage and mixing device such as to be mobile. The pressure difference therefore acts on the opening means which results in a motion of the means.

Direct opening is also evident if both the container and the opening device move, i.e. if both are supported in the container opening system such as to be mobile.

Direct opening is evident if the pressure difference presses a container or a part of a container onto a static opening means. In this context, the differential pressure acts directly on the mobile container such that said container moves against the opening means. For this purpose, the container is supported in the device such as to be mobile. Pressing the container against the opening means causes the container to be broken, cut or pierced open, and thus to be opened by mechanical means.

In this context, the invention can provide an opening element to be arranged in the device to be mobile relative to the second chamber or the storage container. In this context, the opening element or the container or both can be supported in the device such as to be mobile.

Moreover, the invention can provide a mobile pestle to form an opening element that is be arranged in the device in shiftable manner such that the chamber or the storage container for the liquid component can be opened through the motion of the pestle.

A refinement of the invention provides the mobile pestle to comprise a fork-shaped guidance for guiding a part of the container to be broken open and/or the interior of the pestle to be bevelled.

It is of advantage in this context if at least a part of the container can be broken, broken-off, cut open, cut off or pierced through the motion of the pestle such that the pestle acts as opening device.

Alternatively, it can be advantageous that the pestle is connected to the container in suitable manner for the motion of the pestle to press the container onto a part of the device, whereby the container is thus broken, broken open, cut open or pierced. Accordingly, the mobile pestle can, for example, be a hollow body that is closed on one side and has the container arranged in it.

Moreover, the motion of the pestle can tilt the container, whereby a part of the container becomes fixed in place in the container opening system in suitable manner for the fixed part of the container to be broken off.

A lever can serve as opening facility just as well, whereby the lever can be rotated or tilted through the motion of the pestle with the container and at least a part of the container is broken off, cut open or pierced through the rotation of the lever arm of the lever.

An alternative embodiment provides the container to comprise a preferably flexible wall and the opening device to be a mandrel or a blade, whereby the container is arranged such as to be mobile in the container opening system and/or the wall is malleable. In this context, the wall of the container is cut open or pierced, and thus opened, when the container is moved towards the mandrel.

The invention can just as well provide that the container or containers contain a liquid, in particular a monomer liquid, and/or a powder, in particular a cement powder, whereby the content exits from the container after opening through the action of the negative pressure, in particular a vacuum, and is subsequently mixed with a powder, in particular a cement powder, or a liquid, in particular a monomer liquid, through the action of the negative pressure, in particular a vacuum.

It is particularly preferred for the container to contain a liquid that contains a monomer component, preferably a polymerisable monomer such as, for example, methylmethacrylate, and an activator dissolved therein.

The mixing space preferably contains a powder that contains one or more polymers, in particular based on polymethylmethacrylate and co-monomers thereof.

The basic element comprises a connecting line to allow the liquid component, in particular the monomer liquid, to flow from the storage element into the device. The monomer liquid flows from the storage container through the connecting line into the mixing device, in particular into the mixing space. In this location, the liquid component, in particular the monomer liquid, is mixed with the solid component, in particular the bone cement powder, in order to form the bone cement.

It is a major advantage of the present invention that the vacuum that is present in the operating theatre anyway where vacuum cementing systems are applied is used not only to remove gas inclusions in the cement dough, but the working capacity of the vacuum is utilised also to transfer the monomer into the cement powder and mix the monomer liquid and the cement powder to form a homogeneous cement dough. In a particularly advantageous embodiment of the invention, the vacuum also serves to open the monomer container such that these processes proceed by themselves just through the action of the vacuum and the medical user is no longer required to perform these processes manually. Accordingly, a self-mixing vacuum cementing system is being provided to the medical user.

Figure 2:
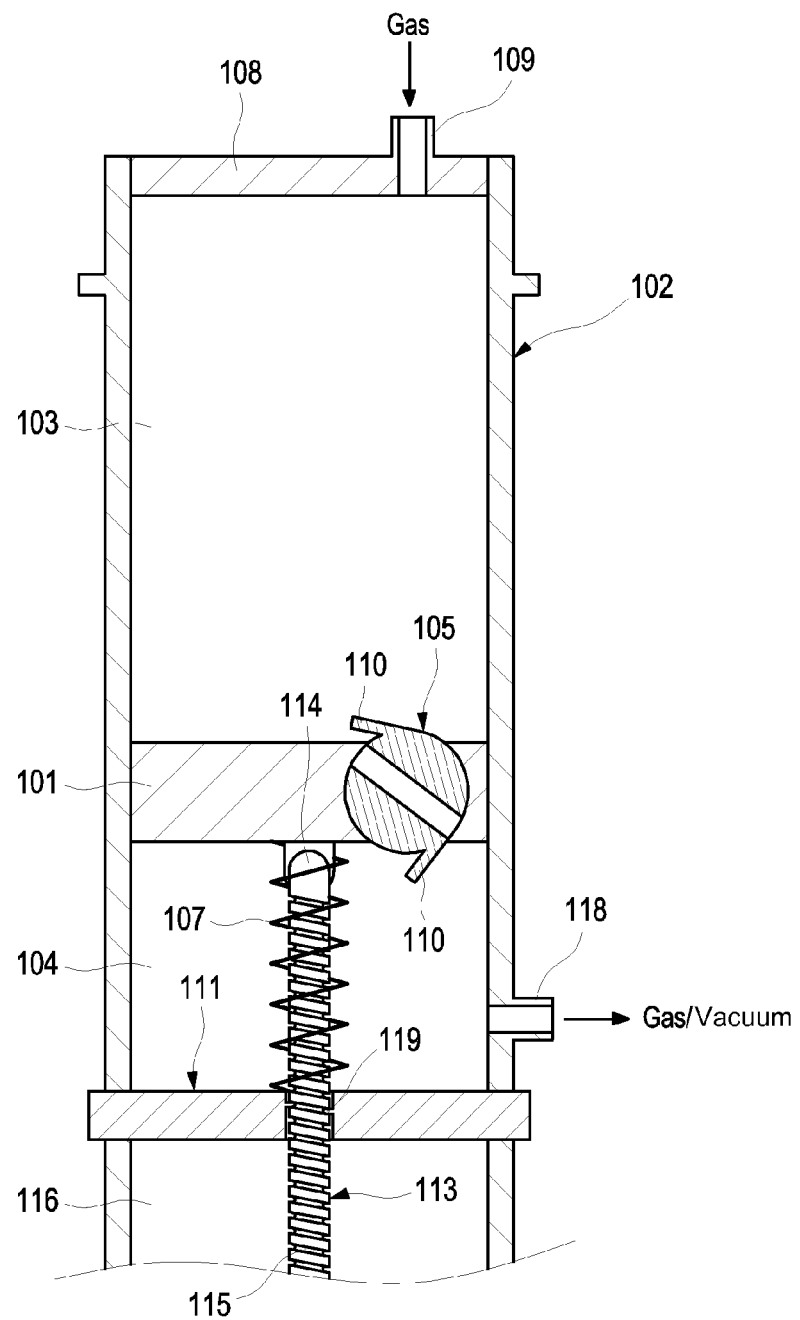

A preferred embodiment is described in more detail in the following based on the appended drawings. In the figures:

FIG. 1 shows a sectional view of a schematic drawing of a storage and mixing device according to the invention; and FIG. 2 shows a sectional view of a detail of a second embodiment of the invention.

FIG. 1 shows a storage and mixing device 100 according to the invention. The storage and mixing device 100 comprises a device 102 for mixing and dispensing bone cement. Said device 102 is supported, like on a bearing, on a basic element 120 in the exemplary embodiment shown. Said basic element 120 also bears a storage vessel having a storage chamber 204 for monomer liquid. The storage and mixing device 100 serves for mixing of the bone cement. For this purpose, bone cement powder is filled into a mixing space 116 of the storage and mixing device 100. The bone cement powder can then be mixed with the monomer liquid in order to form bone cement.

The device 102 for mixing and dispensing bone cement comprises a mixing space 116. The mixing space 116 has a mixing organ 117 arranged in it that is connected to a plunger 101 by means of a threaded rod 113. The plunger 101 can be made to move through the application of a vacuum at the gas outlet 118, whereby the bone cement can be mixed, which is described in more detail below referring to FIG. 2.

As made evident through FIG. 1, the storage chamber 204 is also part of the bone cement system. The storage chamber 204 contains a storage container 202 for the monomer liquid. Advantageously, the storage container 202 is an ampoule. The ampoule 202 comprises an ampoule head 203 and an ampoule body arranged above the ampoule head. A pre-determined breakage site is present between the ampoule head 203 and the ampoule body.

An outlet opening 206 is provided in the storage chamber 204 below the ampoule head 203. The upper side of the storage chamber 204 is closed through a lid 207. The lid 207 is connected to the storage chamber 204 by means of a thread or other closure mechanism.

A cylindrical opening is provided in the walls of the storage chamber 204 in the region of the ampoule head 203 and has a cylindrical pestle 209 arranged in it that is mobile along its symmetry axis. The side of the pestle 209 that extends into the interior of the storage chamber 204 is bevelled. The bevelling is to ensure that the ampoule head 203 breaks off the ampoule body easily when the pestle 209 is pushed into the interior of the storage chamber 204. The same purpose can be served by a bevelling at the fixation 205 of the ampoule that is situated opposite from the pestle 209. Both measures are intended to focus the force acting through the pestle 209 on the breakage zone and to enhance it.

The walls of the storage chamber 204 and the lid 207 are resistant to pressure, i.e. retain their shape even when a vacuum is generated on the interior of the storage chamber 204. The pestle 209 is lodged in a gas-tight press-fit in the opening of the walls of the storage chamber 204.

The device according to the invention can be operated, for example, as follows: Firstly, a negative pressure is applied at the outlet opening 206. This generates a negative pressure in the interior of the storage chamber 204 as well. The difference in pressure between the interior of the storage chamber 204 and the exterior environment of the storage chamber 204 causes a larger pressure, and therefore a larger force, to act on the surface of the pestle 209 facing outward than on the surface of the pestle 209 facing inward. The pestle 209 thus experiences a resultant force that drives it into the interior of the storage chamber 204. Once as the static friction of the pestle 209, which is in a press-fit, is overcome through the resultant force, the pestle 209 moves into the interior of the storage chamber 204. Lastly, the pestle 209 is to hit against the ampoule head 203 and shear it off. This opens the ampoule 202. The content of the ampoule 202 flows out of the ampoule and through the outlet opening 206 to exit from the storage chamber 204.

The static friction of the pestle 209 in the opening of the storage chamber 204 and/or the stability of the breakage zone of the ampoule 202 or the cross-section of the pestle 209 can be adjusted in suitable manner in this context such that the ampoule 202 is being opened only when the negative pressure in the storage chamber 204 is sufficient for a sufficiently bubble-free mixture to be generated from monomer liquid and bone cement powder.

The monomer liquid then flows from the storage chamber 204 through a conducting means 122 into the mixing device 102. The transfer flow of the monomer liquid is enhanced through negative pressure that is built-up in the mixing space 116.

As is evident from FIG. 2, the mixing device 102 comprises a plunger space and a mixing space 116 that are separated from each other by means of a dividing wall 111 that allows the pressure to be equalised. A plunger 101 subdivides the plunger space into two plunger space sections 103, 104. Said plunger 101 has a rotary valve 105 arranged in it, which, in the open state, connects both plunger space sections 103, 104 to each other. In the closed state, the two plunger space sections 103, 104 are separated from each other in a gas-tight manner. A spring element 107 is arranged between the dividing wall 111 to the mixing space 116 and the plunger 101 and, in the relaxed state, presses the plunger 101 against the internal wall of a plunger space cover 108 of the first plunger space section 103.

A pressure difference is built-up between the two plunger space sections 103 and 104 if a vacuum is then applied to the second plunger space section 104 and the rotary valve 105 is in the closed state. The pressure applied to the second plunger space section 104 is lower than that applied to the first plunger space section 103. Said pressure difference moves the plunger 101 against the force of the spring element 107 towards the dividing wall 111. In the immediate vicinity of the dividing wall 111, a pin 110 that is arranged on the rotary valve hits against the dividing wall 111 and is pressed against the plunger 101 through the dividing wall such that the rotary valve 105 moves into the open position. This results in the pressure being equalised between the two plunger space section 103 and 104. The overpressure in the first plunger space section is removed and the plunger 101 moves in the direction of a plunger space cover 108 of the first plunger space section 103 by means of the restoring force of the spring element 107. In this place, a second pin 110 that is arranged on the rotary valve hits against the plunger space cover 108. This switches the rotary valve 105 to the closed position. With the rotary valve 105 closed, a pressure difference can be built-up again that moves the plunger 101 towards the dividing wall 111 again. This process is repeated for as long as a vacuum is applied.

The up-and-down motion causes a rod 113, which is attached to the plunger 101 by means of a rotary joint 114, to also be moved up and down. The rod 113 has a thread 115 recessed into it that is being engaged by pegs 119 that are arranged in an opening of the dividing wall 111. The up-and-down motion of the rod 113 and the thread 115 engaging the pegs 119 make the rod rotate simultaneously.

Accordingly, bone cement can be mixed efficiently by means of a mixing organ 117 that is attached to the rod 113 (see FIG. 1) and also moves up-and-down and rotates simultaneously.

In the present storage and mixing system, much like in many new vacuum cementing systems, a vacuum is generated anyway, for example in order to mix a monomer liquid and a bone cement in a vacuum. Said vacuum can be used simultaneously in a device according to the invention to open a separation between monomer liquid and mixing space, to transfer monomer liquid to the mixing space, and to activate the mixing facility.

LIST OF REFERENCE NUMBERS

100 Storage and mixing device
101 Plunger
102 Mixing device, device for mixing and dispensing bone cement
103 First plunger space section
104 Second plunger space section
105 Blocking organ, rotary valve
107 Elastically restoring element, spring element
108 Plunger space cover
109 Gas inlet
110 Pins
111 Dividing wall
113 Rod
114 Rotary joint
115 Thread
116 Mixing space
117 Mixing organ
118 Gas outlet
119 Pegs
120 Basic element
122 Connecting line
202 Storage container, ampoule
203 Ampoule head
204 Storage chamber
205 Fixation
206 Outlet opening
207 Lid
209 Pestle

We claim:

1. A device for mixing of a liquid component and a solid component, the device comprising:
a storage chamber containing the liquid component and having an openable separation;
a mixing device connected to the storage chamber, wherein the mixing device has an interior that is separated into a plunger space and a mixing space by a dividing wall, wherein the mixing space contains the solid component, wherein the mixing device has a connection for a source of negative pressure; and
a mixing organ positioned within the mixing space and movable via a pressure difference provided in the plunger space, wherein
a plunger subdivides the plunger space into a first plunger space section and a second plunger space section and comprises a blocking organ, that is switchable at plunger turnaround points, and, in the open state, connects the first plunger space section to the second plunger space section,
the connection for the source of negative pressure is arranged in the second plunger space section,
an elastically restoring structural element is arranged between the plunger and the dividing wall,
a gas feed is arranged in the first plunger space section, and the mixing organ is connected to the plunger.

2. The device according to claim 1, wherein the mixing space contains a powder as the solid component and the storage chamber contains a monomer liquid as the liquid component for producing bone cement.

3. The device according to claim 1, wherein the mixing organ arranged in the first chamber is driven by means of the source of negative pressure.

4. The storage and mixing device according to claim 1, wherein the openable separation is located between the storage chamber and the mixing device and is openable by mechanical means, directly or indirectly, through the pressure difference built-up through the source of negative pressure.

5. The device according to claim 1, wherein a vacuum is connected at the connection for the source of negative pressure.

6. The device according claim 1, wherein the blocking organ is a rotary valve.

7. The device according to claim 6, further comprising two pins attached on the external circumference of the rotary valve and arranged at an angle of <180° with respect to each other originating from the rotation axis of the rotary valve.

8. The device according to claim 1, further comprising a threaded rod connecting the plunger and the mixing organ to each other and extends through the second plunger space section, the threaded rod is connected to the plunger by means of a rotary joint, whereby the thread of the threaded rod is engaged by fixed pins of the dividing wall.

9. The device according to claim 1, wherein the openable separation is openable by means of the pressure difference.

10. The device according to claim 9, wherein a container is arranged in the storage chamber, and the openable separation is openable through an opening facility of the storage chamber that is movable by means of the pressure difference.

11. The device according to claim 10, wherein the opening facility comprises a movable pestle.

12. The device according to claim 11, wherein the pestle comprises beveling.

13. The device according to claim 10, wherein the container is an ampoule for accommodating monomer liquid and the storage and mixing device comprises a connecting line between container and first chamber.

14. The device according to claim 11, wherein the movable pestle is a cylindrical pestle.

15. A device for mixing of a liquid component and a solid component, the device comprising:
a storage chamber containing the liquid component and having an openable separation;
a mixing device having a total length defined between a first wall and a second wall located opposite with respect to the first wall, wherein the mixing device has an interior that is separated into a plunger space and a mixing space by a dividing wall, wherein the mixing space contains the solid component, wherein the mixing device comprises a connection for a source of negative pressure located on a side wall of the mixing device between the first and second walls of the mixing device; and
a mixing organ positioned within the mixing space and movable via a pressure difference provided in the plunger space.

16. A device for mixing of a liquid component and a solid component, the device comprising:
a storage chamber containing the liquid component and having an openable separation,
a mixing device having a total length defined between a first wall and a second wall located opposite with respect to the first wall, wherein the mixing device has an interior that is separated into a plunger space and a mixing space by a dividing wall, wherein the mixing space contains the solid component, wherein the mixing device has a connection for a source of negative pressure;
a mixing organ positioned within the mixing space and movable via a pressure difference arranged in the plunger space; and
a plunger positioned within the plunger space and movable between the first wall and the dividing wall via the pressure difference arranged in the plunger space.

* * * * *